Aug. 4, 1953 M. G. WHITE 2,648,000
CONTROL OF WAVE LENGTH IN WAVE GUIDES
Original Filed Oct. 2, 1943 2 Sheets-Sheet 1
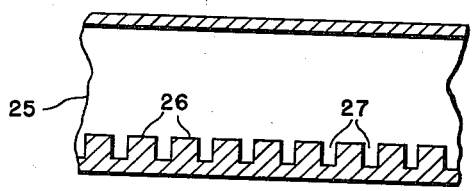
FIG. 1
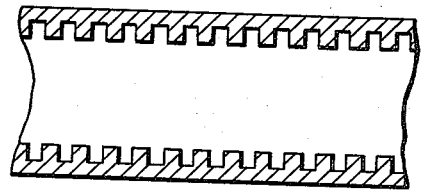
FIG. 2
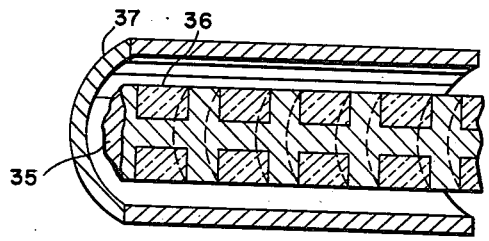
FIG. 3
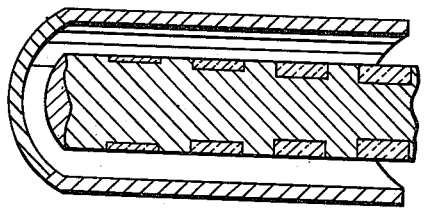
FIG. 4
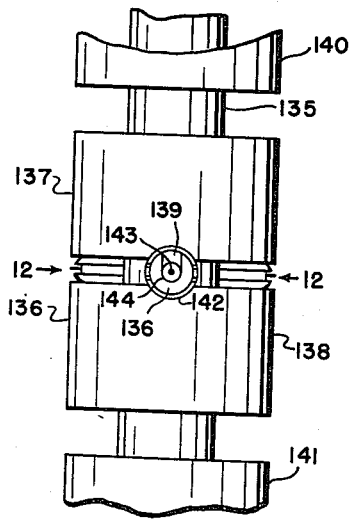
FIG. 11
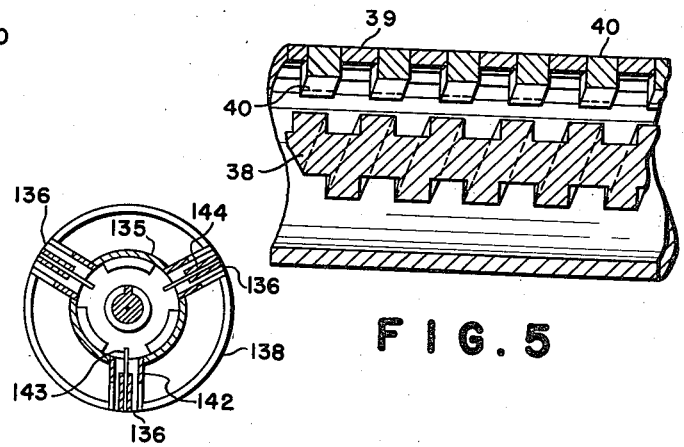
FIG. 12
FIG. 5
INVENTOR
MILTON G. WHITE
BY
ATTORNEY Aug. 4, 1953
M. G. WHITE
2,648,000
CONTROL OF WAVE LENGTH IN WAVE GUIDES
Original Filed Oct. 2, 1943
2 Sheets-Sheet 2
FIG. 6
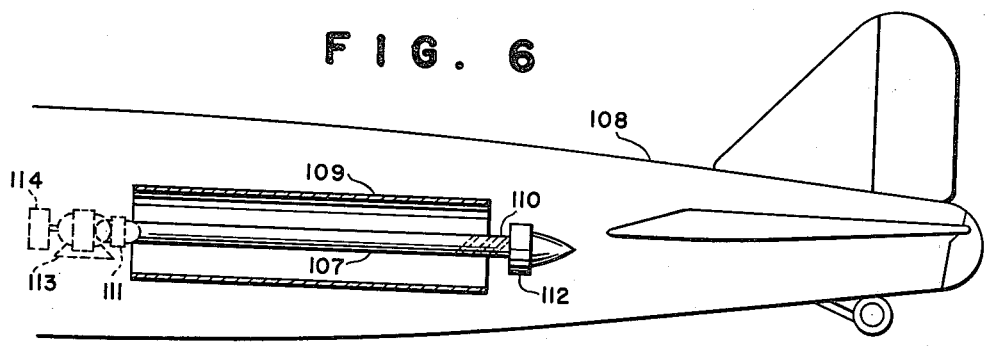
FIG. 7
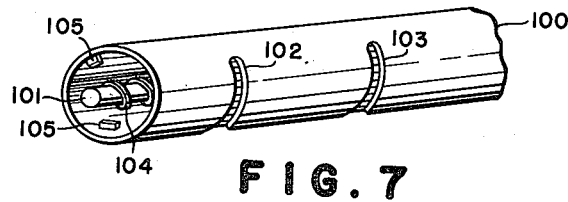
FIG. 8
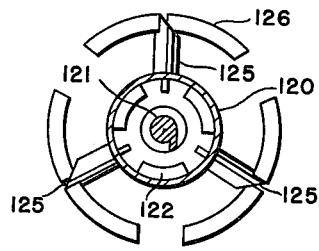
FIG. 10
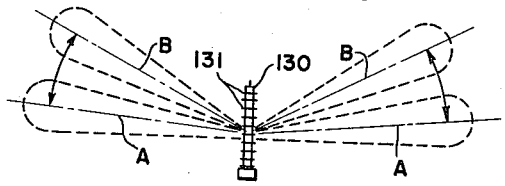
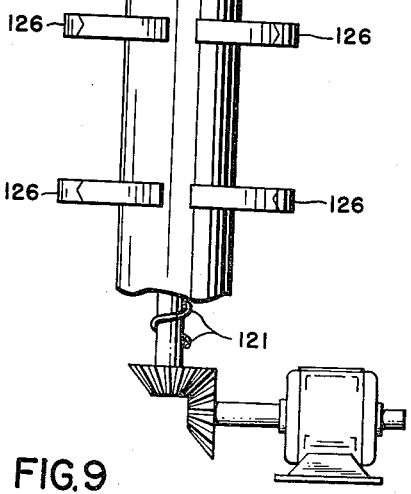
FIG. 9
*INVENTOR*
MILTON G. WHITE
BY
*ATTORNEY*

Patented Aug. 4, 1953

2,648,000

UNITED STATES PATENT OFFICE 2,648,000

CONTROL OF WAVE LENGTH IN WAVE GUIDES

Milton G. White, Princeton, N. J., assignor, by mesne assignments, to the United States of America as represented by the Secretary of the Navy Original application October 2, 1943, Serial No. 504,777. Divided and this application June 14, 1951, Serial No. 231,494

11 Claims. (Cl. 250—33.53)

This invention relates to the transmission of high-frequency electric oscillations and more particularly to the transmission of electric waves in wave guides and other such transmission apparatus. The invention is applicable both to coaxial-conductor wave guides and to hollow-pipe wave guides and concerns control of the wave length of traveling waves of a given frequency within such wave guides.

This application is a division of copending application Serial No. 504,777, filed October 2, 1943, Patent No. 2,567,748 and entitled Control of Wave Length in Wave Guides.

For many purposes it is desirable to modify the wave length of electric oscillations of a given frequency in a wave guide structure. Sometimes it is desired to shorten the wave length. Sometimes, in addition to shortening the wave lengths, it is even desired to provide arrangements for varying, periodically or otherwise, the wave length of the oscillations in the wave guide. Simple shortening of the wave length can be accomplished by substituting solid dielectric material for the otherwise more convenient air insulation, but this method of shortening the wave length has certain disadvantages. If the dielectric material extends completely across the wave guide or even across a large portion of the wave guide, the accumulation of moisture or dirt on the surfaces of the various pieces of dielectric material involves an electrical breakdown hazard which is particularly serious on account of the fact that if a breakdown should occur, the dielectric, if it is of organic material as in the case of the dielectrics with the most desirable electrical qualities, will be carbonized and precipitate a permanent failure or at least a source of losses, and in some cases the dielectric may actually catch fire. Also, when the wave guide is filled or almost filled with solid dielectric material it becomes very difficult to provide arrangements for varying the wave length in the wave guide for a given frequency over any substantial range of wave lengths.

It is an object of the present invention to provide for shortening the wave length in wave guide structures by the provision of suitable structures in said wave guides. It is a further object of this invention to provide such wave length shortening without the use of solid dielectric material in any location of high electric stress and, in the general case, without the necessity of any solid dielectric material at all. It is a further object of this invention to provide means for varying at will within a substantial range the wave length of electric oscillations in a wave guide without varying the frequency thereof. It is a further object of the invention to provide a certain advantageous type of antenna systems employing wave guides, in which the wave length of electric oscillations is controlled as aforesaid. Still a further object of the invention is to provide wave guides with shortened wave length characteristics with respect to waves transmitted therein which exhibit such characteristics in connection with the transmission of traveling waves under conditions of good energy transfer and low internal reflection and even in the substantial absence of standing waves.

In accordance with the present invention, certain repeated obstructions relatively closely spaced in terms of the wave length are introduced or constructed in a wave guide, which so affect the field, as further explained below, that the wave length is shortened. A number of forms of such arrangements are possible and it is also possible to provide means for mechanically moving certain of the obstructions which means are capable of producing a variation in the shortening of the wave length, which is to say a variation in the wave length for a given frequency. The invention will be more fully explained in connection with the accompanying drawing in which:

Figs. 1 and 2 are longitudinal cross sections of portions of wave guides in which the wave length for a given frequency has been modified in accordance with the present invention;

Fig. 3 is a longitudinal cross section of another form of wave guide modified in accordance with the present invention;

Fig. 4 is a longitudinal cross section illustrating the construction of a length of wave guide adapted to provide a transition between a conventional wave guide and a wave guide with a modified form of construction in accordance with the present invention;

Fig. 5 is a longitudinal cross section of a form of wave guide constructed in accordance with the present invention adapted for variation of the wave length of oscillations in the wave guide;

Fig. 6 is a general view and Fig. 7 is a detail of a form of antenna system making use of the present invention;

Figs. 8 and 9 show still another form of antenna system making use of the present invention, Fig. 8 being an end view partly in section and Fig. 9 being a side elevation partly broken off;

Fig. 10 is a diagram illustrating the operation of the apparatus of Figs. 8 and 9;

Fig. 11 is a broken off side elevation illustrating still another form of antenna system embodying the present invention and Fig. 12 is a transverse cross section of the same along the line 12, 12 of Fig. 11.

The more general principles of the invention will be understood from a consideration of Fig. 1. In Fig. 1 is shown a wave guide 25 which may have a rectangular transverse cross section. The bottom wall of the wave guide 25 is provided with a series of ridges 26 and grooves or valleys 27 arranged transversely of the longitudinal dimension of the wave guide. The ridges 26 may or may not extend completely across the wave guide, as is more fully pointed out below. The wave guide may be regarded as one provided with transverse ridges or as one provided with transverse grooves or pockets. For the purposes of the invention it is quite unimportant whether the recurrent modifications of the wave guide shape are in the form of projections extending into the wave guide or pockets extending out of the wave guide. These recurrent modifications of the wave guide cross section should, however, be in relatively large number per wave length— about ten or twelve per wave length in the guide is a convenient number although somewhat less could be used. It can be shown that when the modifications of the wave-guide cross section are evenly spaced, which is usually desirable, no frequency can be effectively transmitted with reasonable power transfer for which the wave length is shorter than twice the distance between corresponding portions of successive obstructions (or of successive pockets). For this reason, in order to avoid approach to this cut-off wave length, I provide more than two and usually at least three complete repetitions or cycles of wave-guide cross section change per wave length in the wave guide. This means, in the case of structures for varying the wave length in the guide, more than two such cycles per wave length for the shortest wave length used. In practice I prefer considerably more than two such cycles per wave length, for instance, about 6 or 7 cycles.

The depth of the grooves or pockets 27, and accordingly the height of the ridges or projections 26 is not particularly critical except that these dimensions are less than necessary for resonance at the frequency of transmission, which is to say less than a quarter-wave length. These dimensions are usually considerably less than a quarter-wave length, for reasons that will presently appear.

Although it is desirable for good results that the transverse ridges 26 should be abrupt—that is, should have abrupt rising and falling faces transverse to the wave guide—it is not necessary that their profile be rectangular. The rectangular profile is, however, preferred.

When the wave guide 25 is excited with the electric vector of oscillations in the vertical direction with respect to the cross section shown in Fig. 1, there will be in addition to the vertically directed electric field between the top and bottom walls of the wave guide 25, a longitudinal electric field across the grooves or slots 27. There will also be certain circulating currents across the grooves. The presence and the configuration of such electric fields can be estimated with good accuracy for practical purposes by an analysis of the system making use of Maxwell's equations, but this analysis of the situation is not necessary for the practical understanding and application of the invention. It is necessary only to point out that the analysis shows that the wave length in the guide 25 is shortened by the presence of the grooves and ridges and that this effect is confirmed by experiment. The amount of wave length change can be predicted mathematically. Thus for groove depth (or ridge height) substantially less than a quarter-wave length, the velocity of propagation, in the case in which the wave guide 25 is, instead of a rectangular wave guide, a parallel-plate wave guide having a smooth upper surface and a corrugated lower surface, is equal to $$V = \frac{c}{\sqrt{1 + Ld/XY}}$$

in which, as shown on Fig. 1, L is the groove depth, $d$ is the groove width, X is the distance from the tops of the ridges to the upper plate of the wave guide, Y is the distance between centers of adjacent ridges or grooves and $c$ is the usual velocity of light in free space. Suitable adjustments of the calculations for the rectangular wave guide case and for the case where the ridges do not go completely across the wave guide can be made by known methods.

Where the grooves are much less than a quarter-wave length deep, the effect on the wave length is substantially independent of frequency so that the effect may be regarded as an increase in the effective dielectric constant of the dielectric in the wave guide (which is usually air). Regarded in this way, the effective dielectric constant $K_e$ may be expressed as $$\left(1 + \frac{Ld}{XY}\right)$$

The magnitude of this effective dielectric constant is thus seen to be determined by the relative volume of the grooves or slots and of the remaining portion of the wave guide. This relation is found to hold to a reasonable degree of approximation for the rectangular wave guide, with the exception that the portion of the ridges and grooves which is near to the lateral walls of the wave guide does not add to the wave length shortening effect because of the configuration of the magnetic field and therefore the provision of an ungrooved channel at each lateral side of the wave guide produces a greater shortening of the wave length than if the grooves and ridges were continued to the edge of the wave guide. Where such channel is of substantial width, the above-given formula for the effective dielectric constant provides a reasonable approximation of the wave length effect that may be expected.

As the depth of the grooves 27 approaches an electrical quarter-wave length (the actual length of which differs according to whether the grooves are open at the ends, towards the sides of the wave guide, or are closed by conducting surfaces) the velocity of propagation is no longer independent of frequency and the effective dielectric constant varies much as the actual dielectric constant of a material varies in the neighborhood of frequencies for which there exists "anomalous dispersion," increasing greatly as the frequency is raised (presumably on the other side of resonance, when the pockets or grooves are more than a quarter-wave length and less than a half-wave length deep, a wave-length lengthening effect will exist, which is again analogous to the phenomena associated with "anomalous dispersion" in optics). The shortening of the wave length proceeds until a wave length of twice the distance between corresponding parts of successive ridges is reached at which value of wave length very high energy reflections are set up. This value of wave length is reached before the frequency quite reaches the value for which the depth of the grooves is an electrical quarter-wave length. At such frequencies, moreover, the circulating currents in the grooves become large, causing losses which attenuate transmission along the wave guide, so that this type of behavior is to be avoided for the purposes of the present invention and the groove depth is therefore made substantially less than an electrical quarter-wave length.

Fig. 2 shows another type of wave guide in which the wave length is shortened in accordance with the above principles. In Fig. 2 the wave guide is again rectangular in transverse cross section but both the upper and lower walls of the wave guide are provided with transverse ridges and grooves in the same manner as the lower wall of the wave guide in Fig. 1. The walls provided with the ridges and grooves should be the broader walls of the wave guide, which is to say that in the normal mode of transmission the electric vector of the oscillations in the mid-portion of the wave guide will be vertically directed with respect to Fig. 2. A cylindrical wave guide may be designed to have a longitudinal cross section similar to Fig. 2. Thus in general it may be said that the grooves and ridges should be transverse to the flow of oscillatory currents in the portion of the wave guide wall occupied by the grooves, under conditions of wave transmission.

The effect of the ridges and grooves may be increased by filling the grooves with solid dielectric material as illustrated in Fig. 3. The solid dielectric material increases the effective electrical depth of the grooves in proportion with the square root of the dielectric constant of the material. The solid dielectric material, which may conveniently be polystyrene, is not subjected to particularly high electric stresses because the grooves are normally non-resonant. The form of wave guide shown in Fig. 3 is the coaxial-conductor type, the ridges and grooves in this case being formed on the central conductor 35. The grooves are then annular in shape, being filled with dielectric material shown at 36. If desired, grooves or ridges of a similar sort might be provided upon the outer conductor 37, but in general it is more convenient to provide these features upon the inner conductor alone. The solid dielectric material shown in 36 has the advantage of serving not only to increase the effective depth of the grooves but also to maintain the rigidity of the inner conductor, permitting a good deal of such inner conductor to be cut away without loss of rigidity. Solid dielectric may similarly be used in rectangular wave guide structure to increase the effective depth of transverse grooves.

The "characteristic impedance" of a wave guide modified in accordance with the present invention by the introduction of ridges and grooves corresponds approximately to the characteristic impedance of a smooth wave guide of approximately the same average cross section as the corrugated wave guide. Consequently when a portion of smooth wave guide is to be coupled for maximum energy transfer to a portion of corrugated wave guide, there should be little or no change in the average cross section, or else some known form of impedance-matching device should be employed. Fig. 4 shows an impedance-matching device of the "taper section" class. It is designed to provide a transition between a coaxial-conductor wave guide or transmission line of the smooth (unmodified) type with a cross section such as that shown at the left on Fig. 4 to a modified wave guide such as that shown in Fig. 3. The transition is accomplished by providing annular notches or grooves such that each succeeding notch or groove is a little deeper than the preceding one, until the groove depth reaches the desired amount for the transmission line of the type shown in Fig. 3 to which it is desired to transfer energy. For good results the transition should be spread out over one or more wave lengths, the more gradual kinds of transition producing less reflections and having less frequency-sensitivity. The arrangement in Fig. 4, in which the transition from a normal wave guide to one modified for the shortening of the wave length in the guide is accomplished by providing dielectric-filled notches successively of increasing depth without change of the outer diameter of the inner conductor structure, has the advantage of permitting one to obtain full advantage of the space within the outer conductor up to the limits imposed by considerations regarding breakdown voltages between the inner and outer conductors.

In Fig. 5 there is shown a coaxial-conductor wave guide in which the inner conductor is provided with ridges and grooves, the ridges and grooves in this case being in the form of a continuous screw thread instead of in the form of annular rings and channels. The outer conductor of the wave guide shown in Fig. 5 is provided with spaced projections 40. These projections may be in a longitudinal row or in several staggered longitudinal rows, the projections being spaced by the spacing between turns of the screw thread on the inner conductor 38. If desired, the projections of the outer conductor 39 might also be provided in the coalesced form of a continuous screw thread, but because of the difficulty of preparing such a structure it is preferred to provide a row of obstructions, which might be regarded as a discontinuous screw thread, and which may be conveniently mortised into the outer conductor 39. Means may then be provided (not shown), for rotating the inner conductor 38 on its axis, with the result that the configuration of the electric field of the transmitted oscillations may be made to vary according to the rotational position of the inner conductor 38. It is found that such variation results in variation of the wave length of oscillations of a given frequency transmitted in the wave guide. The wave length is shortest when the screw thread ridges on the inner conductor 38 are substantially in registry with the projections 40 and becomes less short as the said ridges and the said projections are displaced with respect to each other. The wave length change which accompanies the relative shift of the ridges of the inner conductor past the projections on the outer conductor in the apparatus of Fig. 5 may be explained by considering that as the ridges and projections move into registry, the electric field between them is intensified because of the increased localized capacitance, which intensification of charge is probably accompanied by increased activity of the field in the grooves between the various ridges and projections, thus intensifying the wave-length shortening effect of these said grooves.

Figs. 6 and 7 illustrate a type of scanning steerable directive antenna which is particularly useful for certain special purposes. As shown in Fig. 7 the antenna system comprises a coaxial-conductor wave guide having an outer conductor 100 and an inner conductor 101, the outer conductor 100 having transverse slots at spaced intervals on one side. If desired, the transverse slots may be approximately a half-wave length long, thus acting as "magnetic dipoles." Two such slots are shown at 102 and 103 in Fig. 7. The inner conductor 101 is provided with a radial projection in the form of a screw thread 104, substantially as shown with respect to the inner conductor 38 of Fig. 5. On the inner side of the outer conductor 100 are provided certain projections 105 adapted to cooperate with the screw thread 104 and the inner conductor 101 to provide a variable shortening of the wave length as the inner conductor 101 is rotated, again as described in connection with Fig. 5.

The slotted modified coaxial conductor wave guide shown in Fig. 7 may be mounted, as shown in Fig. 6, on the side of the fuselage of an airplane. The coaxial-wave guide, shown at 107 is mounted clear of the fuselage, and the fuselage shown generally at 108, is provided with a reflector 109 in the form of a cylindrical paraboloid mounted in the fuselage wall and facing the wave guide 107 which lies in its focal axis, so that the reflector 109 is adapted to provide a certain amount of vertical concentration of the directional characteristics of the slotted wave guide 107. The wave guide 107 is so oriented that the slots are directed toward the reflector 109. Means (not shown) are provided for exciting the wave guide 107 at its left-hand (forward) end and for connecting the wave guide 107 with a suitable transmitter receiver apparatus (not shown). Absorbing material shown generally at 110 is provided in the right-hand end of the wave guide 107 to absorb such power as is not radiated from the antenna during transmission and to mitigate undesired standing waves in the wave guide system. Means are also provided for rotating the inner conductor 101 in order to cause periodic variations of the directional characteristics of the antenna system, such means including the faired bearings 111 and 112, the motor 113 (geared to the inner conductor by means not shown) and the translating device (which may be a potentiometer) 114 which is adapted to provide to the receiver of the radio system (not shown) information concerning the orientation of the directivity pattern of the antenna system.

By virtue of the wave-length-shortening effect provided in accordance with this invention, the wave length in the wave guide 107 will be shorter than the wave lengths of oscillations of the same frequency in free space. This condition is a practical necessity for the production of effective directional antenna characteristics from a series of slots such as the slots 102 and 103, because if the wave length in the wave guide 107 were the same or larger than the wave length in free space there would be interference from higher order beams or "lobes" which would form part of the directivity characteristic of the system. When the wave length in the guide 107 is such that the slots are spaced by the wave length in the guide, the maximum radiation will be in a direction normal to the axis of the guide. If the slotted portion of the guide is of substantial length, an extremely sharp beam may be produced (sharpness being in a plane substantially perpendicular to the axis of the guide, the beam being sent out in such a plane). The spacing between the slots should, as previously suggested, be less than the wave length in free space.

In practice it may be desirable to avoid operation in which the wave length in the guide passes through a value for which the slots are exactly one wave length in the guide apart because for such value of the wave length in the guide the reflections set up by the various slots add up in phase and standing waves of fairly high amplitude exist in the wave guide 107. This condition, however, exists only for a relatively narrow range of values of wave length in the guide in the neighborhood of that just mentioned, so that this phenomenon may actually be used to calibrate continuously the apparatus used, in order to indicate accurately the position of the directive maximum of the antenna system, as noted in the application of L. W. Alvarez, Serial No. 509,790. It is generally desirable to operate the apparatus in a range over which the spacing between the slots remains less than a wave length in the guide, or possibly reaches equality with a wave length in the guide, only at the extreme portion of the cycle for purposes of check or calibration. If it is desired to center the sweep of the directive characteristics of the antenna system upon the direction perpendicular to the axis of the airplane, the wave guide 107 may be arranged at a small angle to the axis of the airplane, which is quite feasible since the fuselage 108 will normally be narrower towards the rear of the airplane. In general an apparatus such as that shown in Fig. 6 will be mounted on each side of the airplane fuselage 108 and the apparatus will be used for such purposes as detecting the presence of vessels at sea at long distances from a patrolling aircraft, thus greatly extending the area covered by the patrol. Other apparatus of known types could be used on the aircraft for detecting vessels nearer to the course of the patrolling craft.

Figs. 8 through 12 relate to antenna systems adapted to produce a beam having practically no horizontal directivity but having a certain amount of vertical directivity, the vertical directive pattern having preferably a maximum at some small angle with the horizontal. Such antenna systems are particularly useful for "beacons" such as are employed in the systems described by L. W. Alvarez in patent application Serial No. 479,625, filed March 18, 1943, for Radio Beacon and System for Utilizing It.

Figs. 8 and 9 illustrate one form of antenna system for the above-mentioned service. The antenna system is mounted on a coaxial-type wave guide 120. The inner conductor is provided with a radial projection 121 of the screw thread type after the manner of construction shown in Fig. 5. Cooperating projections 122 are mounted in the manner previously described upon the inner surface of the outer conductor of the wave guide 120. The wave guide 120 is fed from below by means not shown and is terminated at its upper extremity by absorbing material shown generally at 123. A bearing 124 is provided at the upper end for centering the inner conductor and means in the form of a conventional bevel gear drive is included for imparting rotation thereto. At intervals along the vertical length of the wave guide 120 there are mounted circumferentially arranged dipoles fed by short branch wave guides of the coaxial type connected electrostatically to the wave guide 120 by the extension of the inner conductor of the branch wave guide into the interior of the wave guide 120 as shown on Fig. 8. The branch wave guides are shown at 125 and the dipoles at 126. As shown on Fig. 8, the arms of the dipoles 126 are curved so that the several dipoles located at the same vertical height on the wave guide 120 form a circle which has only relatively small interruptions. In consequence the horizontal directivity characteristic of the antenna system is almost uniform over all horizontal angles. The number of dipoles in each circle may be more or less than shown, according to the outer diameter of the wave guide 120. Three such dipoles in each circle has been found to be a convenient arrangement. The use of three dipoles in each ring is convenient for producing a ring of approximately half-wave length diameter, which may also have some electrical advantages (compare the dipole ring to a loop antenna).

In this type of antenna system it is not necessary to space the antenna elements vertically by electrical dimensions approaching a wave length, since alternate vertical sets of dipoles may be oppositely connected to the branch wave guides 125, thus permitting spacing of the general order of one-half wave length while maintaining approximately co-phased excitation of the various dipoles. Thus one ring of dipoles might have the lefthand arm connected to the outer conductor of the branch wave guide 125 and the right-hand arm connected to the inner conductor of the branch wave guide 125, as shown in Fig. 8, and the next adjacent rings of dipoles in the vertical direction might have their lefthand arm connected to the inner conductor of the branch wave guide and their right-hand arm connected to the outer conductor of the branch wave guide respectively. The advantages of this type of arrangement are more fully described in the patent application of L. W. Alvarez, Serial No. 509,790, filed November 10, 1943.

Fig. 10 illustrates the directional characteristics of the type of antenna system illustrated in Figs. 8 and 9. At the center of Fig. 10 is represented in diagrammatic fashion the antenna system including the coaxial conductor type wave guide 130 and the dipole ring 131. The spacing between dipole rings and the values of wave length in the guide are such that as the inner conductor of the wave guide 130 is rotated, the direction of maximum radiation (or sensitivity in the case of reception) in the vertical plane moves from the orientation shown at A to the orientation shown at B and back. It is to be noted that if the device is to be fed from below, the vertical spacing between dipole rings should be greater than half of the shortest wave length in the guide 120 (and less than the free space wave length). If vertical spacing less than half of the longest wave length used in the guide 120 is employed, the apparatus must be fed from the top to obtain an upwardly directed beam. Special types of energy distribution may be obtained by varying the illumination of the various dipole rings with respect to each other. The illumination may be varied by adjusting the extent to which the inner conductors of the branch wave guides 125 (Fig. 8) protrude into the electric field of the wave guide 120.

The antenna system illustrated in Figs. 8 and 9 provides radiation which is horizontally polarized. For some purposes it is desirable to provide a radiation pattern substantially similar to that produced by the antenna system of Figs. 8 and 9 but involving vertically polarized radiation. Such a radiation pattern is obtainable with apparatus of the type shown in Figs. 11 and 12, Fig. 12 being a cross section of the apparatus of Fig. 11 at the position indicated by 12, 12.

The antenna elements are again fed by a central wave guide, shown at 135. At spaced positions along the length of the wave guide 135 are groups of three or more branch wave guides 136, each of which includes an outer metallic tube 142 and an inner metallic rod 143. The tube 142 is split along a diameter, the split being electrically a quarter-wave length long so that when the tube is suitably excited an alternating voltage at the resonant frequency may appear between the two branches of the tubular member 142, which alternating voltage will be at a maximum at the end of the member. The excitation is provided by the central rod 143 which is slidably fitted in a metallic tube 144 in order that by adjustment of the insertion of the rod 143 into wave guide 135 the excitation may be varied. The metallic tube 143 is connected with one of the segments of the tubular member 142, the connection being made through rod 139 (Fig. 11). Each of the branch wave guides 136 of any one group are located with their centers in substantially the same plane perpendicular to the axis of the wave guide 135. The branch wave guides 136 of any one group feed and support in parallel a cylindrical dipole made up of two cylinders 137 and 138, the cylinder 137 being mechanically and electrically connected to the upper segment of the split portions of the branch guides 136 (the split being made in a horizontal plane) and the cylinder 138 being mechanically and electrically connected to the lower segment of the split structures 136.

Just as in Figs. 8 and 9 successive dipole rings were oppositely connected with respect to the branch wave guide 125, so in the apparatus of Fig. 11 successive cylindrical dipole rings will be arranged to be oppositely excited with respect to the branch wave guides 136, which is to say that for one cylindrical dipole the connection indicated by the rod 139 will be upwardly directed, and in adjacent cylindrical dipoles above and below, this same connection will connect the central conductor of the branch guide 136 to the lower of the split segments. By providing reversals in this manner, a desirable radiation pattern can be more effectively obtained, as is more fully explained in the patent application of L. W. Alvarez, Serial No. 509,790. The cylinders 139 and 140, which are shown broken away on Fig. 11 indicate portions of dipoles adjacent to the dipole 140, 141.

Various other ways of applying the principles of the present invention for shortening the wave length of oscillations of a given frequency in wave guides of various types and/or for providing adjustability or variability of the wave length in such wave guides for a given frequency of operation are possible within the spirit of the present invention, the scope of which is indicated by the appended claims.

References to wave length made herein are intended to refer to desired frequencies of operation, at which it is intended that radio-frequency power should be transferred through the wave guide or guides in question. Unless otherwise specified, wave length dimensions refer to the wave length in the particular structure or environment under consideration.

What is claimed is:

1. An antenna comprising, a coaxial wave guide having inner and outer conductors, one of said conductors being rotatably mounted relative to the other of said conductors, said outer conductor having a plurality of spaced radial projections extending into the space between said conductors and said inner conductor having a continuous screw thread also extending into said space, a plurality of spaced dipole elements mounted on said outer conductor and electrically coupled to said space, and means for rotating said rotatably mounted member.

2. An antenna having variable directivity comprising, a coaxial wave guide having inner and outer conductors, said outer conductor having a plurality of spaced radial projections extending into the space between said conductors and said inner conductor having a continuous screw thread also extending into said space, a plurality of radiating elements longitudinally spaced along said outer conductor and electrically coupled to the space between said inner and outer conductors, and means for rotating said inner conductor relative to said outer conductor.

3. An antenna having variable directivity comprising, a section of coaxial wave guide having inner and outer conductors, said outer conductor having a plurality of spaced radial projections extending into the space between said conductors and said inner conductor having a continuous screw thread also extending into said space, means connected to one end of said section of wave guide for energizing said antenna, a termination of absorbing material at the other end of said section, a plurality of dipoles circumferentially arranged on said outer conductor and spaced along the length of said section and electrostatically coupled to said wave guide, and means for rotating said inner conductor relative to said outer conductor.

4. An antenna having variable directivity comprising, a section of coaxial wave guide having inner and outer conductors, said outer conductor having a plurality of spaced radial projections extending into the space between said conductors and said inner conductor having a continuous screw thread formed thereon also extending into said space, means connected to one end of said wave guide for energizing said antenna, a plurality of groups of dipoles spaced along the length of said wave guide, the dipoles of each of said groups being circumferentially arranged about the outer conductor of said wave guide, means electrically coupling each of said dipoles to the space between the inner and outer conductors of said wave guide, and means for rotating said inner conductor relative to said outer conductor.

5. An antenna having variable directivity comprising, a section of coaxial wave guide having inner and outer conductors, said outer conductor having a plurality of radial projections extending into the space between said conductors and said inner conductor having a continuous screw thread formed thereon also extending into said space, means connected to one end of said section for exciting said antenna with electromagnetic energy, a plurality of groups of dipoles spaced along the length of said section to provide a stacked arrray, the dipoles of each of said groups being circumferentially arranged about said outer conductor in a plane transverse to the axis of said wave guide, means coupled to said space for energizing each of said dipoles, the dipoles of adjacent groups being oppositely connected, and means for rotating said inner conductor relative to said outer conductor for cyclically varying the velocity of phase propagation of energy within said wave guide.

6. An antenna having variable directivity comprising, a section of coaxial wave guide having inner and outer conductors, said outer conductor having a plurality of radial projections extending into the space between said conductors and said inner conductor having a continuous screw thread formed thereon also extending into said space, means connected to one end of said section for exciting said antenna with electromagnetic energy, a plurality of radiators spaced along the length of said section of wave guide, each of said radiators comprising a pair of conducting cylindrical members concentrically surrounding said wave guide, means coupled to said space for energizing adjacent ends of each of said pairs of cylindrical members, and means for rotating said inner conductor relative to said outer conductor.

7. An antenna having variable directivity comprising, a section of coaxial wave guide having inner and outer conductors, said outer conductor having a plurality of radial projections extending into the space between said conductors and said inner conductor having a continuous screw thread formed thereon also extending into said space, means connected to one end of said section for exciting said antenna with electromagnetic energy, a plurality of radiators longitudinally spaced along said section of wave guide, each of said radiators comprising a pair of spaced conducting cylinders of substantially larger diameter than the diameter of said outer conductor concentrically mounted on said outer conductor, a plurality of coupling probes extending into said space and electrically coupled to said cylinders at their adjacent ends, and means for rotating said inner conductor relative to said outer conductor for cyclically varying the velocity of phase propagation of energy within said wave guide.

8. An antenna having variable directivity comprising, a section of coaxial wave guide having inner and outer conductors, said outer conductor having a plurality of radial projections extending into the space between said conductors and said inner conductor having a continuous screw thread formed thereon also extending into said space, means connected to one end of said section for exciting said antenna with electromagnetic energy, a plurality of radiators longitudinally spaced along said section of wave guide, each of said radiators comprising a pair of spaced conducting cylinders supported concentrically on said outer conductor, a plurality of circumferentially spaced branch wave guides electrically coupled to said space and joined to the cylinders of each pair at their adjacent ends, and means for rotating said inner conductor relative to said outer conductor.

9. An antenna having variable directivity comprising, a section of coaxial wave guide having inner and outer conductors, said outer conductor having a plurality of radial projections extending into the space between said conductors and said inner conductor having a continuous screw thread formed thereon also extending into said space, means connected to one end of said section for exciting said antenna with electromagnetic energy, a plurality of radiators longitudinally spaced along said section of wave guide, each of said radiators comprising a pair of closely spaced conducting cylinders concentrically arranged with said coaxial wave guide, means for supporting and energizing said cylinders, said last-mentioned means comprising a plurality of branch wave guides extending radially from said wave guide and disposed in a plane transverse to the axis of said wave guide and connected to said pair of cylinders at their adjacent ends, said branch wave guides each comprising a coaxial line having its inner conductor electrically coupling said cylinders to said space, and means for rotating the inner conductor of said wave guide section relative to the outer conductor.

10. An antenna having variable directivity comprising, a section of coaxial wave guide having inner and outer conductors, said outer conductor having a plurality of radial projections extending into the space between said conductors and said inner conductor having a continuous screw thread formed thereon also extending into said space, means connected to one end of said section for exciting said antenna with electromagnetic energy, a plurality of radiators longitudinally spaced along said section of wave guide, each of said radiators including a pair of conducting cylinders longitudinally spaced from each other and concentrically surrounding said outer conductor, three branch wave guides associated with each pair of said cylinders arranged to support and energize said cylinders, each of said branch wave guides comprising a coaxial transmission line having a cylindrical outer conductor and an inner conductor, said cylindrical outer conductor having a diametral slot cut therein to a depth equal to a quarter wave length at the frequency of operation and disposed in a plane transverse to the axis of said wave guide, adjacent ends of said cylinders being secured to opposite branches of said outer conductor, the inner conductor of said branch wave guides electrically coupling said cylinders to said space, and means for rotating the inner conductor of said coaxial wave guide relative to the outer conductor.

11. Apparatus for oscillating the spatial pattern of a directional antenna comprising, a coaxial wave guide section having inner and outer conductors, said conductors being provided with confronting projections thereon so arranged that upon relative rotation of said conductors the velocity of phase propagation of energy within said wave guide is varied, a plurality of dipole radiators spaced along the length of said outer conductor with the separation between adjacent radiators being substantially a half wave length of the frequency of oscillations within said wave guide and means for coupling said radiators to said wave guide section whereby said dipoles are cophasely excited.

MILTON G. WHITE.

References Cited in the file of this patent

UNITED STATES PATENTS

| Number | Name | Date |
|---|---|---|
| 2,226,479 | Pupp | Dec. 24, 1940 |
| 2,349,942 | Dallenbach | May 30, 1944 |
| 2,468,751 | Hansen et al. | May 3, 1949 |